(12) United States Patent
Wood et al.

(10) Patent No.: US 7,750,840 B2
(45) Date of Patent: Jul. 6, 2010

(54) METHOD AND APPARATUS FOR ASSESSING CONTACT CLUSTERS

(75) Inventors: Thomas E. Wood, Portsmouth, RI (US); Paul R. Work, Bristol, RI (US)

(73) Assignee: Raytheon Company, Waltham, MA (US)

( * ) Notice: Subject to any disclaimer, the term of this patent is extended or adjusted under 35 U.S.C. 154(b) by 211 days.

(21) Appl. No.: 11/950,111

(22) Filed: Dec. 4, 2007

(65) Prior Publication Data

US 2009/0140909 A1   Jun. 4, 2009

(51) Int. Cl.
*G01S 13/66* (2006.01)
(52) U.S. Cl. .................... 342/95; 342/96; 342/189
(58) Field of Classification Search ............ 342/28, 342/90, 95–97, 189, 195
See application file for complete search history.

(56) References Cited

U.S. PATENT DOCUMENTS

| | | | |
|---|---|---|---|
| 4,779,203 A | 10/1988 | McClure et al. | |
| 4,789,940 A | 12/1988 | Christian | |
| 4,893,815 A | 1/1990 | Rowan | |
| 5,020,411 A | 6/1991 | Rowan | |
| 5,032,023 A | 7/1991 | Schneiter | |
| 5,061,062 A | 10/1991 | Schneiter | |
| 5,082,362 A | 1/1992 | Schneiter | |
| 5,341,142 A * | 8/1994 | Reis et al. ............ | 342/64 |
| 5,341,412 A | 8/1994 | Ramot et al. | |
| 5,396,252 A * | 3/1995 | Kelly ................... | 342/94 |
| 5,414,643 A * | 5/1995 | Blackman et al. ....... | 342/95 |
| 5,465,142 A | 11/1995 | Krumes et al. | |
| 5,754,140 A | 5/1998 | Starr et al. | |
| 5,774,357 A | 6/1998 | Hoffberg et al. | |
| 5,805,101 A | 9/1998 | Bodenmueller et al. | |
| 5,821,541 A | 10/1998 | Tumer | |
| 5,841,391 A | 11/1998 | Lucas, Jr. et al. | |
| 5,844,140 A | 12/1998 | Seale | |
| 5,867,386 A | 2/1999 | Hoffberg et al. | |
| 5,875,108 A | 2/1999 | Hoffberg et al. | |
| 5,901,246 A | 5/1999 | Hoffberg et al. | |
| 5,903,454 A | 5/1999 | Hoffberg et al. | |
| 5,910,894 A | 6/1999 | Pryor | |
| 5,920,477 A | 7/1999 | Hoffberg et al. | |
| 5,982,352 A | 11/1999 | Pryor | |
| 5,983,161 A | 11/1999 | Lemelson et al. | |
| 6,081,750 A | 6/2000 | Hoffberg et al. | |
| 6,246,468 B1 | 6/2001 | Dimsdale | |
| 6,275,773 B1 | 8/2001 | Lemelson et al. | |
| 6,314,366 B1 | 11/2001 | Farmakis et al. | |

(Continued)

OTHER PUBLICATIONS

Notification of Transmittal of The International Search Report and The Written Opinion of the International Searching Authority, or the Declaration; PCT/US2008/084609 dated Apr. 1, 2009.

(Continued)

*Primary Examiner*—John B Sotomayor
(74) *Attorney, Agent, or Firm*—Daly, Crowley, Mofford & Durkee, LLP

(57) ABSTRACT

Methods and apparatus for identifying a plurality of contacts from a signal return, defining a zone containing a number of contacts from the plurality of contacts, determining a centroid for the contacts in the zone, and tracking the contacts in the zone as a single contact based on the centroid.

20 Claims, 6 Drawing Sheets

U.S. PATENT DOCUMENTS

| | | | |
|---|---|---|---|
| 6,330,523 B1 | 12/2001 | Kacyra et al. | |
| 6,400,996 B1 | 6/2002 | Hoffberg et al. | |
| 6,418,424 B1 | 7/2002 | Hoffberg et al. | |
| 6,420,698 B1 | 7/2002 | Dimsdale | |
| 6,473,079 B1 | 10/2002 | Kacyra et al. | |
| 6,487,500 B2 | 11/2002 | Lemelson et al. | |
| 6,512,518 B2 | 1/2003 | Dimsdale | |
| 6,512,993 B2 | 1/2003 | Kacyra et al. | |
| 6,640,145 B2 | 10/2003 | Hoffberg et al. | |
| 6,690,296 B2 | 2/2004 | Corwin et al. | |
| 6,734,849 B2 | 5/2004 | Dimsdale et al. | |
| 6,847,462 B1 | 1/2005 | Kacyra et al. | |
| 6,850,252 B1 | 2/2005 | Hoffberg | |
| 7,006,881 B1 | 2/2006 | Hoffberg et al. | |
| 7,084,859 B1 | 8/2006 | Pryor | |
| 7,098,891 B1 | 8/2006 | Pryor | |
| 7,136,710 B1 | 11/2006 | Hoffberg et al. | |
| 7,147,246 B2 | 12/2006 | Breed et al. | |
| 7,164,117 B2 | 1/2007 | Breed et al. | |
| 7,184,036 B2 | 2/2007 | Dimsdale et al. | |
| 7,193,557 B1 | 3/2007 | Kovacich et al. | |
| 7,211,980 B1 | 5/2007 | Bruemmer | |
| 7,215,430 B2 | 5/2007 | Kacyra et al. | |
| 7,236,121 B2 * | 6/2007 | Caber | 342/62 |
| 7,242,988 B1 | 7/2007 | Hoffbert et al. | |
| 7,243,945 B2 | 7/2007 | Breed et al. | |
| 7,274,332 B1 | 9/2007 | Dupray | |
| 7,409,092 B2 * | 8/2008 | Srinivasa | 382/199 |
| 7,417,583 B2 * | 8/2008 | Wood et al. | 342/123 |
| 2002/0113728 A1 | 8/2002 | Munger | |
| 2003/0210170 A1 | 11/2003 | Krikorian et al. | |
| 2004/0201672 A1 * | 10/2004 | Varadarajan et al. | 348/148 |
| 2006/0089799 A1 | 4/2006 | Endoh | |
| 2007/0216566 A1 | 9/2007 | Wood | |
| 2008/0169967 A1 * | 7/2008 | Wood et al. | 342/90 |
| 2009/0140909 A1 * | 6/2009 | Wood et al. | 342/27 |

OTHER PUBLICATIONS

Written Opinion of the International Searching Authority; PCT/US2008/084609 dated Apr. 1, 2009.

* cited by examiner

METHOD AND APPARATUS FOR ASSESSING CONTACT CLUSTERS

BACKGROUND

As is known in the art, conventional maritime radars for shipboard navigation and for coastal surveillance (e.g., land-based Vessel Tracking Systems (VTS)) detect and measure the position of ships and other discrete contacts in two-dimensional space. This space is typically idealized as a local-level (tangent) plane to the Earth coordinatized in natural radar polar coordinates of range R and true azimuth A or in cartesian coordinates (x, y) with positive x pointing in an Easterly direction and positive y pointing North. When these radars are also configured with Automatic Radar Plotting Aids (ARPA), the position of a contact is tracked over time, and a velocity vector is derived.

Shipboard ARPA radars are used to automatically generate alerts for potential collisions by automatically detecting and tracking other ships. Alerts can be generated under certain conditions involving the relative motion of ownership and the contact under track by the radar.

As is also known in the art, conventional shipboard radars have been used by law enforcement entities, such as the United States Coast Guard, to monitor national waters for natural resource utilization (fishing), smuggling (drugs), and illegal immigration. A growing threat to commercial and military shipping stems from use of small boats to damage large ships or other maritime infrastructure, such as oil platforms.

Standard shipboard radars are equipped with an automatic target detection and tracking feature that meets the specifications of the International Electrotechnical Commission (IEC) for Automatic Radar Plotting Aids (ARPA). The ARPA standard was written in support of ship collision avoidance and its tracking performance requirements suit that application well. However, it has been shown that a cluster or "swarm" of small, maneuverable boats can "confuse" the ARPA tracker making it difficult to assess the movement and the number of boats of interest.

For example, an object of interest may attempt to "get lost" in a cluster of boats, often fishing boats, that happen to be in a small area. While the object of interest may be tracked into the fishing boat cluster, it is often difficult to maintain individual track on it while within the cluster. By weaving in and out close to the relatively stationary fishing boats, the object of interest can likely confuse the tracker processing. Once emerging from the cluster, the object of interest will be given a 'head start', on the order of about thirty seconds, for example, while the ARPA tracker tries to re-acquire an individual track, assuming that the contact is within an automatic acquisition zone. By using the clutter provided by the fishing boat, plus the track re-acquisition time, a high speed boat can advance significantly toward its goal without providing a clear track on which to base situational awareness.

SUMMARY

The present invention provides methods and apparatus for tracking a cluster of contacts with a zone. With this arrangement, a cluster of relatively closely-spaced contacts can be tracked as a single contact. While the invention is primarily shown and described in conjunction with a radar, and navigation radars in particular, it is understood that the invention is applicable to sensor systems in general in which it is desirable to track a cluster of contacts.

In one aspect of the invention, a method comprises receiving signal return at a sensor, identifying a plurality of contacts from the signal return, defining a zone containing a number of contacts from the plurality of contacts, determining a centroid for the contacts in the zone using a computer, and tracking the contacts in the zone as a single contact based on the centroid.

The method can include one or more of the following features: the plurality of contacts have a velocity less than a select value, maintaining a count of the number of contacts in the zone, generating an alert when the count changes, modifying boundaries of the zone in response to movement of the contacts in the zone, modifying the boundaries when a first one of the contacts in the zone comes within a track correlation gate distance of a radar, moving the boundary based upon movement of the centroid, creating a further zone of contacts that is a subset of the contacts in the original zone in response to spreading of the contacts, automatically creating the further zone of contacts, individually tracking a contact exited from the zone of contacts, the signal return is processed by a navigational radar, and limiting contacts in the zone to surface vessels less than a selected size having a velocity less than a selected value.

In another aspect of the invention, a system comprises a receiver to receive signal return, a signal processor to process the signal return, a contact cluster module to process a cluster of contacts in the signal return within a zone, and a cluster track module to determine a centroid of the contacts in the cluster of contacts and track the centroid.

The system can include one or more of: a count module to process a count of contacts in the cluster of contacts for selectively generating alerts, a cluster division module to subdivide the zone, a cluster module to move boundaries of the zone based upon locations of contacts in the zone.

In a further aspect of the invention, an article comprises a storage medium having stored thereon instructions that when executed by a machine result in the following: identifying a plurality of contacts from a signal return, defining a zone containing a number of contacts from a plurality of contacts in the signal return, determining a centroid for the contacts in the zone, and tracking the contacts in the zone as a single contact based on the centroid.

BRIEF DESCRIPTION OF THE DRAWINGS

The foregoing features of this invention, as well as the invention itself, may be more fully understood from the following description of the drawings in which.

DETAILED DESCRIPTION

Figure 1:
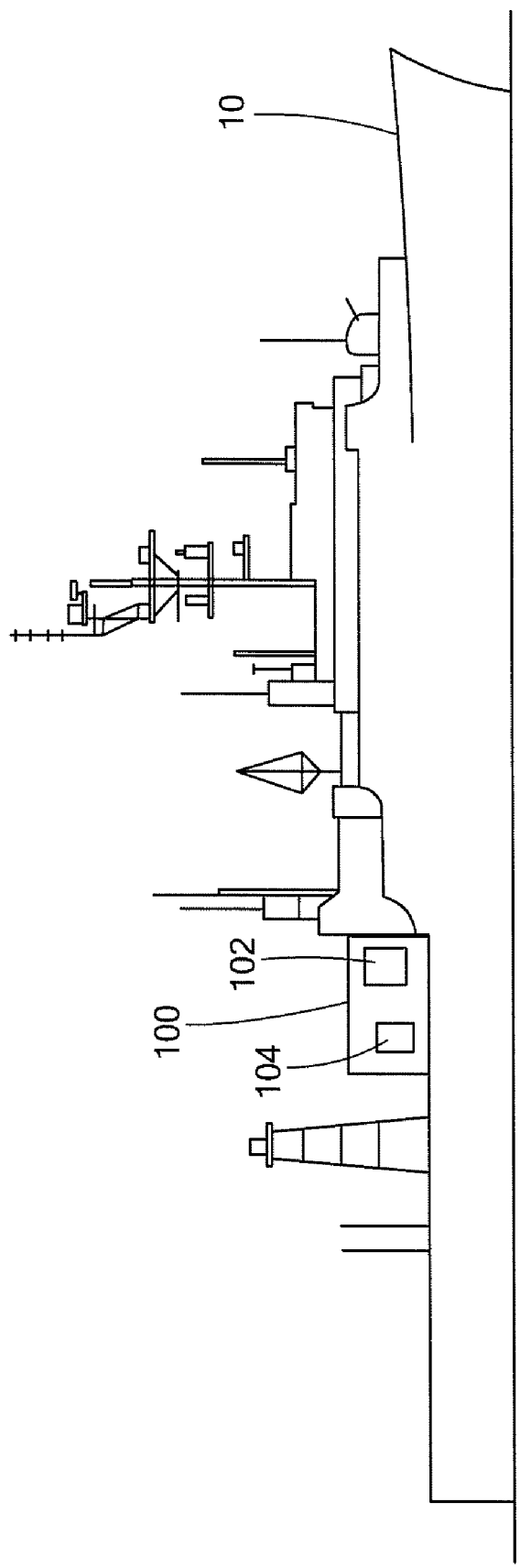
FIG. 1 is a schematic depiction of a system having contact cluster processing in accordance with exemplary embodiments of the invention.

FIG. 1 shows an exemplary radar system 100 having contact cluster processing in accordance with exemplary embodiments of the invention. The radar system 100 can be located on a vehicle 10, such as a ship, or at a fixed location. The radar system 100 includes a signal processing module 102 and a contact cluster module 104 to track a cluster of contacts as a group, as discussed in detail below.

Figure 2A:
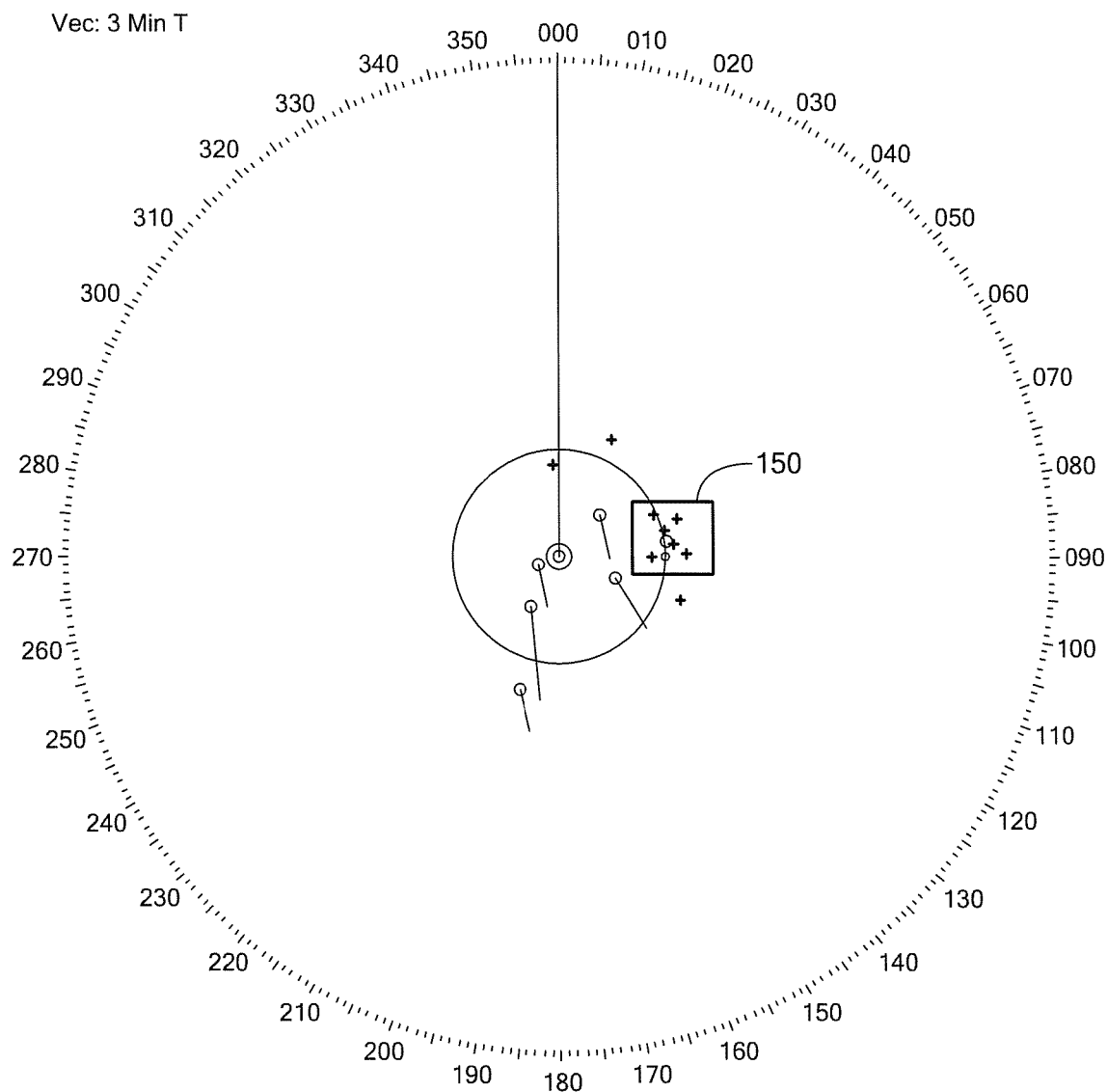
FIG. 2A is a pictorial representation of a radar display for the system of FIG. 1.
Figure 2B:
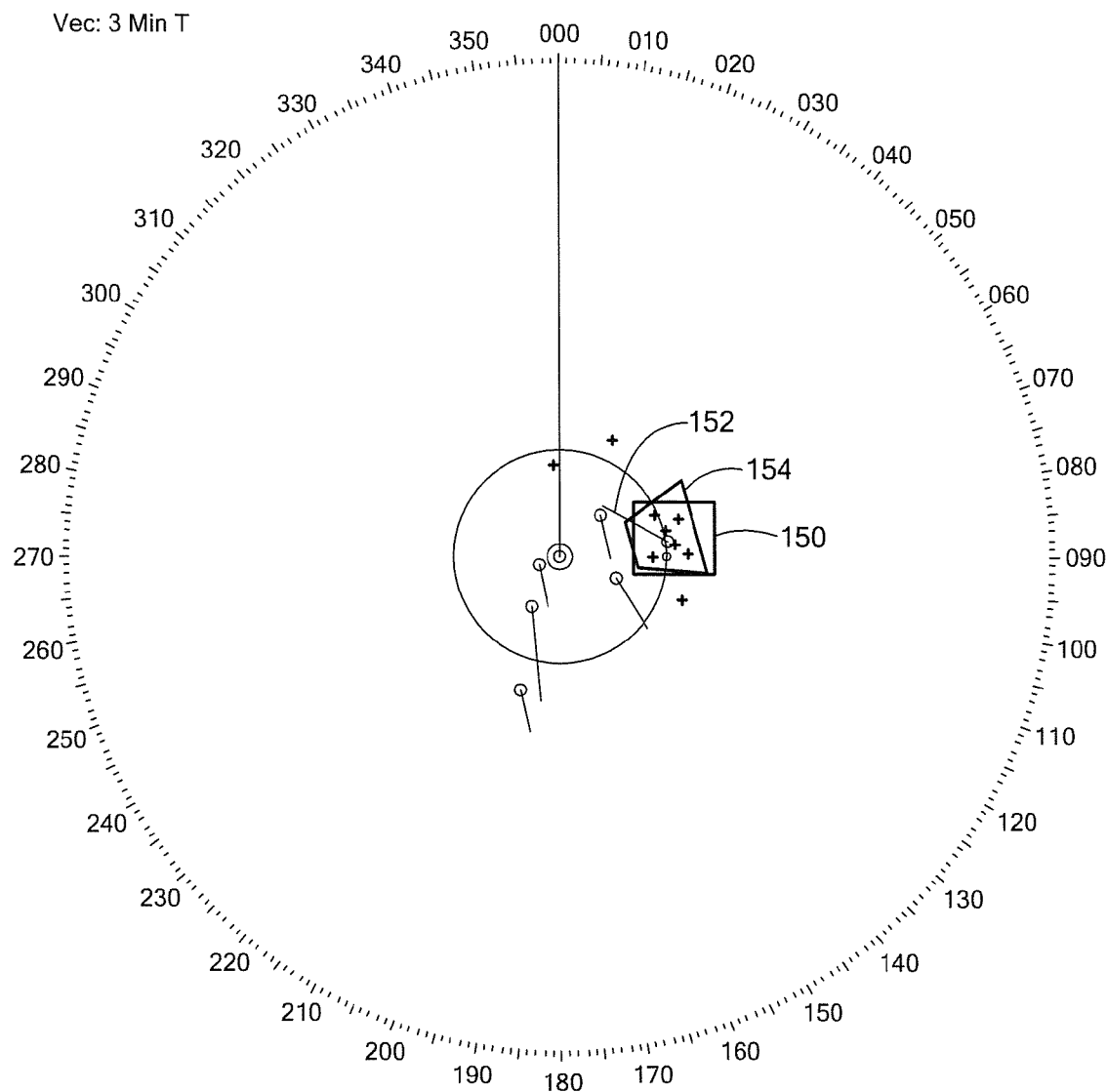
FIG. 2B is a further pictorial representation of a radar display for the system of FIG. 1.

In general, when the system 100 detects a number of contacts that are relatively close together the contact cluster module 104 creates a zone 150 that contains the contact cluster as shown in FIG. 2A. In accordance with conventional notation, plus signs indicate contacts and small circles with a tail attached indicate a contact in track, where length of the tail corresponds to velocity. A centroid for the zone is determined to enable the system to track 152 the contact cluster as shown in FIG. 2B. It is understood that the shape of the zone 150 can be modified somewhat, e.g., into sector shapes 154, for radar processing efficiency. The zone 150 is monitored to identify when contacts leave or enter the zone so that alerts can be generated. Zone boundaries can be modified as one or more contacts move toward a boundary, as described below. The zone may be split into one or more new zones as the cluster separates into sub groups.

While exemplary embodiments of the invention are primarily shown and described in conjunction with radar, and more particularly, navigational radar, it is understood that the invention is appliable to sensor systems in general, including optical systems, in which it is desirable to identify and track contact clusters. In general, exemplary embodiments of the invention are useful for sensor systems that support tracking where track correlation gates are coarser than sensor measurement resolution.

Figure 3:
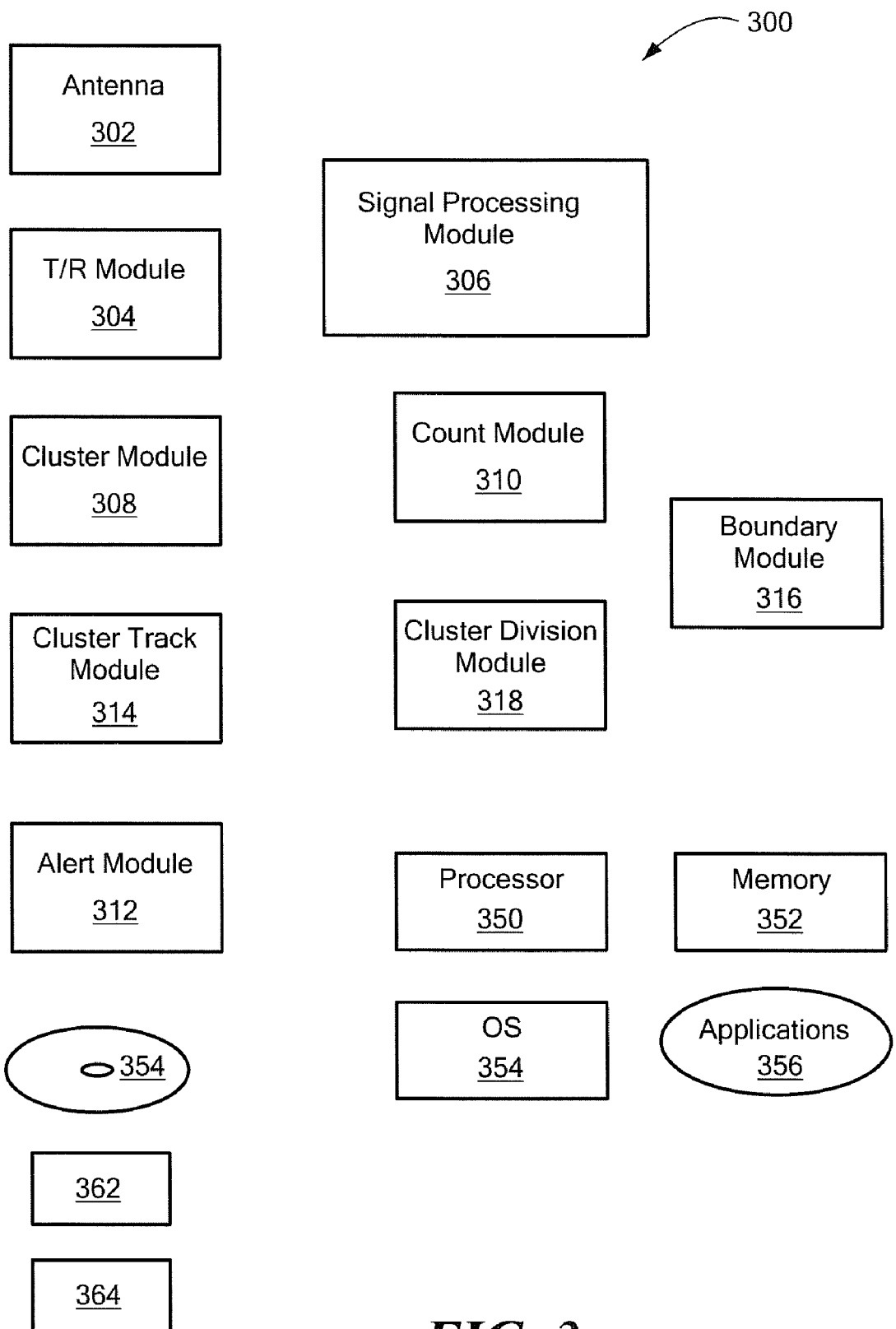
FIG. 3 is a block diagram showing further detail for the system of FIG. 1.

FIG. 3 shows an exemplary sensor system 300 having contact cluster processing in accordance with exemplary embodiments of the invention. The system 300 includes a transmit/receive module 302 coupled to an antenna 304. A signal processing module 306 is coupled to the transmit/receive module 302 for processing signal return.

A cluster processing module 308 provides overall contact cluster processing control and enables a user to create a zone to contain contacts in a cluster. A count module 310 maintains a count of the contacts in the zone. If the count decreases or increases in certain ways, an alert module 312 can generate an alert for an operator.

A cluster track module 314 tracks a contact cluster centroid and a boundary module 316 updates zone boundaries based upon movement of the contacts in the cluster. In an exemplary embodiment, the boundary module 316 updates zone boundaries to expand for maintaining the boundaries a given distance from contacts. A cluster division module 318 determines when a zone should be divided into at least one additional zone due to movement/dispersion of the contacts within the zone. If the contacts have moved into discernible sub clusters, then zones can be created to contain the sub clusters. Contacts that become isolated from the group may exit the zone resulting in movement of the zone boundaries. Processing is described further below.

In an exemplary embodiment, one or more of the above-described modules can run on one or more workstations forming a part of a sensor system. In one embodiment, the modules can be provided as part of a workstations so that the modules run on a central processing unit (CPU)/processor 350 supported by a memory 352. An operating system (OS) 354 supports various applications 356 in a manner well known in the art. The modules can also be provided as stored instructions on computer-readable media, such as disks 360, non-volatile memory 362, and other media types 364 known to one of ordinary skill in the art.

Before describing invention embodiments in further detail some general information is provided that presumes a general understanding of basic sensor system/radar principles. In general, radar processing that leads up to automatic tracking starts with radar thresholding of signals from each transmitted pulse. The thresholding may be designed to minimize the probability of false alarms from noise (background "speckle") and sea clutter. Threshold crossings from contiguous range bins are considered to be from the same contact. As the radar scans in azimuth, blocks of contiguous threshold crossings are checked to see if their range extent overlaps with such blocks on consecutive pulses. By associating contiguous range bins of thresholding crossing signals that overlap in range on consecutive pulses, one builds up an area in range and angle that constitutes the signal return from the contact, which can be referred to a blob.

The blob return from a relatively small target, such as a small motorized boat, typically comprises several range and azimuth cells for the radar. For example, in a short transmitted pulse of 100 nanoseconds and an Analog-to-Digital Converter (ADC) rate of 20 MHz (50 nanoseconds per sample), even a point target would be expected to provide two adjacent range bins of threshold crossing. Also, if the pulse repetition frequency (PRF) is high enough to sample the half power antenna beam, say ten times, then even a point target produces two contiguous range bins of threshold crossings on ten consecutive pulses for a total of twenty digital samples making up a blob.

A blob represents a potential contact and is given a location in space called its "centroid" in a manner well known to one of ordinary skill in the art. For navigation radars, this location is usually depicted as a local level tangent plane to the Earth described in Cartesian (x, y) coordinates. Each centroid may pass through scan-to-scan correlation processing to determine whether significant correlation over time confirms that the centroid meets the properties of contacts of interest. For example, a shipboard radar may not be interested in tracking contacts moving at airplane speeds. By setting correlation gate sizes too small to correlate airplanes, for example, the thresholds of the radar can be lowered, knowing that clutter false alarms are less likely to occur. Lowering thresholds allows the system to identify contacts of interest at further ranges and/or in higher clutter levels.

When centroids pass the correlation filters, they are promoted to "contacts". A contact is simply a point that is believed to represent something of interest and not likely to be a false alarm. Note that many seconds may have passed from the time of first threshold detection to the promotion to contact. Typical rotation rates (scan periods) of maritime radars are on the order of three seconds per scan. For correlation filters relying on, say, six scans, there is on the order of eighteen seconds of delay between first detection and promotion to contact.

A contact can be used to update a tracking filter which derives a velocity estimate on the contact. The derived velocity, along with the measured position, allows the system to extrapolate future positions of the contacts. The extrapolation provides an early warning if the track will pass closely enough to the radar to present a collision hazard. Another purpose of the tracking filter is to predict the location of the contact during the next radar scan to aid in correlating new centroid measurements with the track.

Correlation processing can be used in support of contact tracking, such as scan-to-scan correlation for false alarm control, and association of centroids with existing tracks for track updates. These correlation processes have "gates" that reject data if they are too far from the expected positions but are large enough to pass data that meets the expectations for contact motion and is within measurement errors of the radar itself.

An issue arises when multiple contacts are close enough to share the same or overlapping correlation gates. In such cases, the correlation process may update the wrong track or fail to update another track. Track quality may degrade in multiple ways. For example, the track velocity may swing in the wrong direction pulling the track correlation gate away from the original tracked target. In addition, the track may move away far enough that future measurements fail to correlate and the track is not updated. Failing to update, it will "dead-reckon" in the wrong direction and either disappear or generate a false track. Further, the degraded track may pass through a track fusion process that now confuses the track from one contact with the track of a different contact. As a result of the above, situational awareness may be compromised since the system no longer knows about how many contacts are in the cluster.

Exemplary embodiments of the invention depend upon tracking correlation gates and sensor (radar) resolution. For clusters of boats that maintain separation less than the radar resolution, a single blob is formed and they are tracked as a single entity. If they maintain this configuration, they will be engaged as a single entity. If the radar can resolve the contacts as separate blobs/centroids, they may still fall within each other's tracking gates and confuse the tracking picture. As the typical example below indicates, the sensor resolution may easily have an order of magnitude better ability to resolve contacts than in track correlation gating.

EXAMPLE (1) Radar Resolution. Typical values for maritime radar pulsewidths go as low as 50 nanoseconds or 8 meters in range. Typical half power azimuth beam widths are around 1 degree (17 milliradians), thus representing about 17 meters of cross-line-of-sight resolution at 1 kilometer. It is unusual for fast moving boats to maintain a formation as tight as this resolution and dispersal is expected.

(2) Tracking Gate Sizes. Maritime radars are designed to track all collision hazards, e.g., boats up to speeds of about 40 knots. Since the radar may be installed on a boat also capable of 40 knots, track correlation gates are typically set for tracking contacts with relative motion up to about 100 knots or about 50 meters per second. With antenna scan rates requiring up to 3 seconds per scan, correlation gate sizes need to be on the order of 150 meters to initiate track. Track gate sizes can shrink if near constant velocities can be assumed, but then have to expand upon detection of a contact maneuver.

If clusters of contacts are resolvable by the sensor, but close to one another in terms of track correlation gate size, then exemplary embodiments of the invention can provide a significant improvement in situational awareness as compared with conventional systems.

Figure 4:
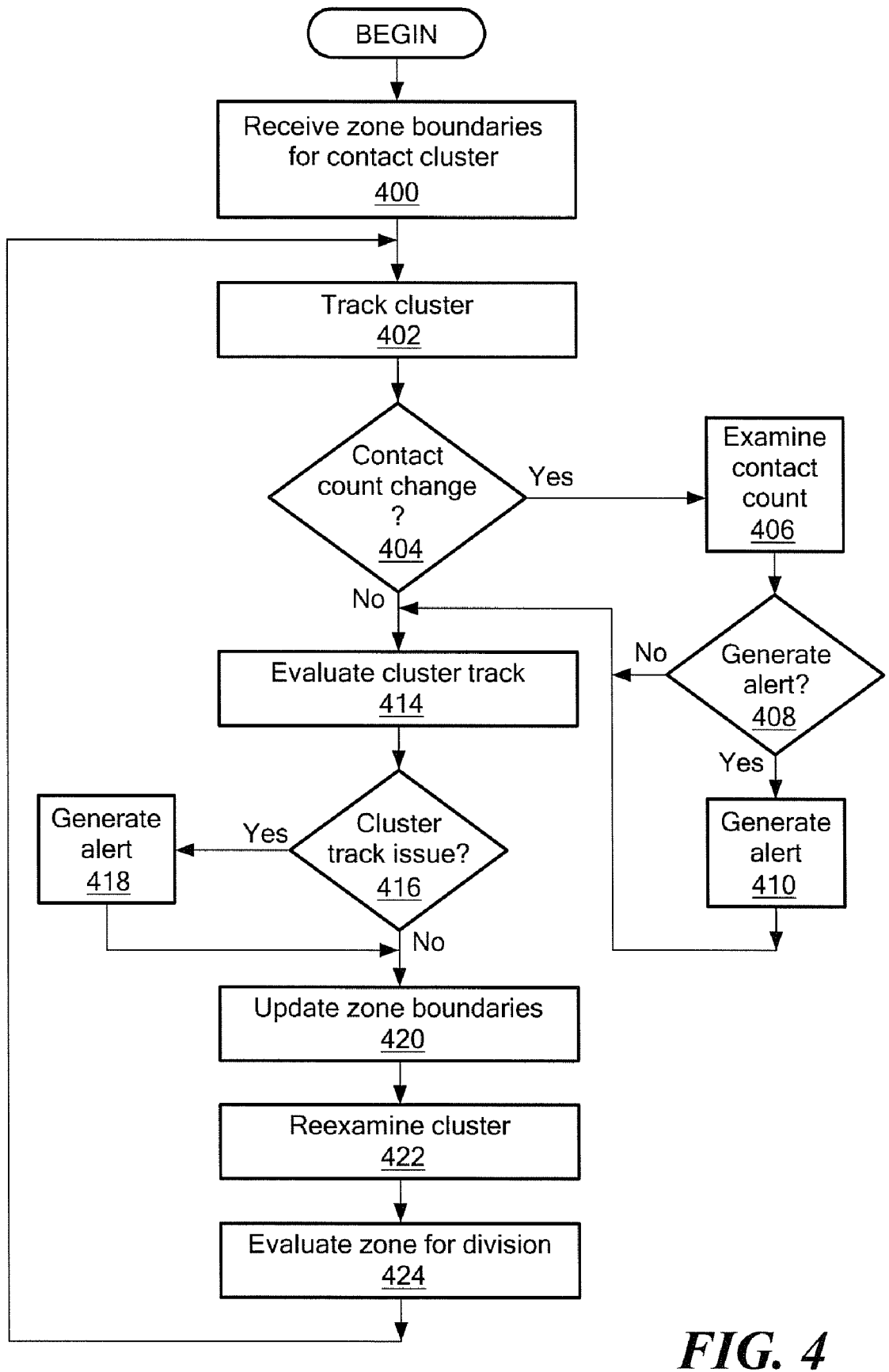
FIG. 4 is a flow diagram showing an exemplary sequence of steps for contact cluster processing in accordance with the present invention.

FIG. 4 shows an exemplary sequence of steps for contact cluster processing in accordance with exemplary embodiments of the invention. In step 400, after a radar operator has noticed a cluster of contacts, the system receives a command from the operator to create a zone to contain the cluster of contacts. Such a cluster could represent a swarm of attacking boats or a stationary group of legal fishing boats that could provide clutter for a single illegal boat. The boats of the cluster may or may not be already tracked individually. It is presumed that the sensor provides the contact (or centroid) information.

In other embodiments, a zone can be automatically created by the system. For example, if a density of contacts per area becomes greater than a given value, a zone is created to contain the contacts. It is understood that in other embodiments, other criteria can be used to create zones to contain contacts in a cluster.

In step 402, system tracks the cluster based upon the centroid of the contacts in the zone. It is understood that a variety of suitable tracking filters will be readily apparent to one of ordinary skill in the art. Exemplary track filters for the contact cluster include well known alpha/beta and multi-hypothesis Kalman-Bucy type filters. In general, the contact cluster should be marked in the processing to prevent fusion with other contact tracks. In step 404, the system determines whether a count of the contacts in the zone has increased or decreased. If so, in step 406 the count change is examined to determine in step 408 whether an alert should be generated in step 410. If not, processing continues in step 414. The count can also be examined to determine if the zone contains less than a predetermined number of contacts. In one embodiment, if the count is zero, i.e., the zone does not contain any contacts, an alert is generated.

In general, number of contacts may change as separated blobs merge when contacts come together more closely than the radar's resolution, or if a contact obscures another member of the cluster so sensor detection fails, or if a contact maneuvers out of the zone. In one embodiment, if the contact count changes on a single scan, this is not considered sufficient to generate an alert. In an exemplary embodiment, a low pass filter can be applied to the contact count to manage alert generation. For example, the filter can have a time constant of several scan periods so that a single scan false alarm or missed detection would not generate an alert. With this arrangement, a change in count would need to persist for several scans in order to generate an alert to tolerate some fluctuation in the count from scan to scan. Generation of the alert can also take into account the magnitude of the change in count from scan to scan.

In step 414, the system evaluates the track for the cluster and in step 416 determines whether the cluster track is expected to approach the radar, or other designated point, within predetermined limits. If so, in step 418, the system generates an alert to inform the operator of the approaching cluster. In an exemplary embodiment, the radar can utilize CPA (closest point of approach) and TCPA (time to closest point of approach) information to determine when an alert should be generated. It is understood that a wide range of criteria well known to one of ordinary skill in the art can be utilized to determine when alerts should be generated due to the track of a cluster/contact.

Figure 5:
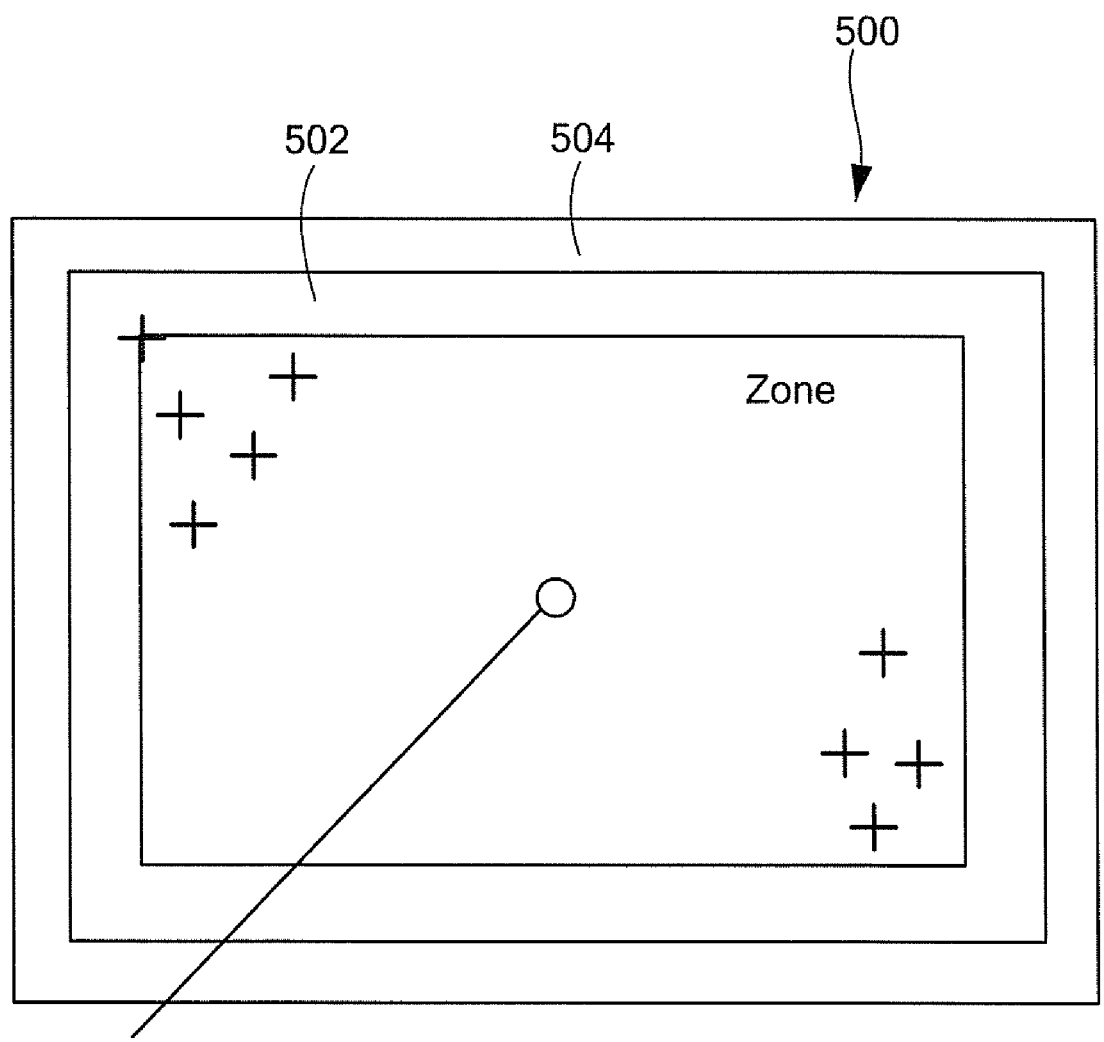
FIG. 5 is a pictorial representation of a zone forming a part of the system of FIG. 1

In step 420, the zone boundaries are updated based upon the location of the contacts. It is understood that the zone shape can comprise any suitable geometry to meet the needs of a particular application. The initial shape of the zone can be generated as a circle, a rectangle, or a more general closed polygon that surrounds a cluster of sensor contacts. For each scan, or some set of selected scans, the zone boundaries are moved to reflect the cluster centroid velocity. As shown in FIG. 5, the zone boundary 500 can be expanded, such as by a correlation gate size 502, or other margin 504, when a contact approaches a boundary. In one embodiment, a boundary of the zone is moved/expanded by X times the tracker correlation gate size.

In step 422, the contact cluster is analyzed based upon the new zone boundaries to determine if any contacts should be dropped. In one embodiment, contacts are associated with its nearest neighbor. If a contact's nearest neighbor is more than Y times the tracker correlation gate size, that contact is removed from the contact cluster. The system can optionally initiate an individual track for the exited contact and generate an alert.

The zone can also be contracted if contacts become more compressed in space. In general, the zone boundaries can be modified based upon a variety of criteria to meet the needs of a particular application. For example, the zone may be contracted more aggressively the closer the cluster centroid is to the radar to allow earlier detection of leakers.

By moving and expanding the zone boundary most contacts in the zone will remain in the zone. However, the zone may overtake and include contacts not previously in the zone. By excluding contacts that become far removed from the cluster, or nearest neighbor, the zone boundaries can 'snap' to the remaining cluster and alert an operator that a contact has 'leaked' from the cluster. Auto-acquiring a track on the leaker enables the system to quickly monitor the leaker's position.

In step 424, the system evaluates the cluster to determine whether the zone should be divided into at least one additional zone for corresponding sub clusters of contacts. For example, if a cluster divides into two separate clusters, a first zone can contain at least some of the contacts contained in the original zone and a second zone can contain other ones of the contacts from the original zone. Some of the original contacts may no longer be part of a cluster and thus not within the first or second zone. In addition, the first and second zones can contain new contacts. The system can generate an alert when an additional zone is added.

Techniques for determining if a cluster has sub-divided are well-known to one of ordinary skill in the art. Exemplary criteria for sub dividing zones include contact density in area, next neighbor location, proximity to the radar, etc. In an exemplary embodiment, an autopoiesis algorithm can be used to automatically determine when the system should sub divide zones. In addition, an operator can manually create desired zones to contain various contact clusters.

It is understood that exemplary embodiments of the invention may partition functionality between hardware and software in a variety of configurations to meet the needs of a particular application. The system may be implemented, at least in part, via a computer program product, (e.g., a computer program tangibly embodied in media, such as a disk), for execution by, or to control the operation of, data processing apparatus, e.g., a programmable processor, a computer, multiple computers, sensor systems, radar systems, etc. Such programs may be implemented in a variety of programming languages well known in the art. A computer program may be deployed to be executed on one computer or on multiple computers at one site or distributed across multiple sites and interconnected by a communication network.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   receiving signal return from a transmitted radar signal at a sensor;
   identifying a plurality of contacts from the signal return;
   defining a zone containing a number of contacts from the plurality of contacts;
   determining a centroid for the contacts in the zone using a computer; and
   tracking the contacts in the zone as a single contact based on the centroid.

2. The method according to claim 1, wherein the plurality of contacts have a velocity less than a select value.

3. The method according to claim 1, further including maintaining a count of the number of contacts in the zone.

4. The method according to claim 3, further including generating an alert when the count changes.

5. The method according to claim 1, further including modifying boundaries of the zone in response to movement of the contacts in the zone.

6. The method according to claim 5, further including modifying the boundaries when a first one of the contacts in the zone comes within a track correlation gate distance of a radar.

7. The method according to claim 1, further including moving the boundary based upon movement of the centroid.

8. The method according to claim 1, further including creating a further zone of contacts that is a subset of the contacts in the original zone in response to spreading of the contacts.

9. The method according to claim 8, further including automatically creating the further zone of contacts.

10. The method according to claim 1, further including individually tracking a contact exited from the zone of contacts.

11. The method according to claim 1, wherein the signal return is processed by a navigational radar.

12. The method according to claim 1, further including limiting contacts in the zone to surface vessels less than a selected size having a velocity less than a selected value.

13. A system, comprising:
   a receiver to receive signal return from a transmitted radar signal;
   a signal processor to process the signal return;
   a contact cluster module to process a cluster of contacts in the signal return within a zone; and
   a cluster track module to determine a centroid of the contacts in the cluster of contacts and track the centroid.

14. The system according to claim 13, further including a count module to process a count of contacts in the cluster of contacts for selectively generating alerts.

15. The system according to claim 13, further including a cluster division module to subdivide the zone.

16. The system according to claim 13, wherein the cluster module moves boundaries of the zone based upon locations of contacts in the zone.

17. An article, comprising:
   a storage medium having stored thereon instructions that when executed by a machine result in the following:
   identifying a plurality of contacts from a signal return from a transmitted radar signal;
   defining a zone containing a number of contacts from a plurality of contacts in the signal return;
   determining a centroid for the contacts in the zone; and
   tracking the contacts in the zone as a single contact based on the centroid.

18. The article according to claim 17, further including instructions for maintaining a count of the number of contacts in the zone and generating an alert when the count changes.

19. The article according to claim 17, further including instructions for modifying boundaries of the zone in response to movement of the contacts in the zone.

20. The article according to claim 17, further including instructions for creating a further zone of contacts that is a subset of the contacts in the original zone in response to spreading of the contacts.

* * * * *